US007021331B2

(12) United States Patent
Jernigan et al.

(10) Patent No.: US 7,021,331 B2
(45) Date of Patent: Apr. 4, 2006

(54) CHECK VALVE WITH LOCKED RESTRAINT MECHANISM

(75) Inventors: Jay M. Jernigan, San Jose, CA (US); Cyrus Kliewer, San Jose, CA (US); Michael McGregor, Scotts Valley, CA (US)

(73) Assignee: Smart Products, Inc., San Jose, CA (US)

( * ) Notice: Subject to any disclaimer, the term of this patent is extended or adjusted under 35 U.S.C. 154(b) by 130 days.

(21) Appl. No.: 10/857,046

(22) Filed: May 28, 2004

(65) Prior Publication Data

US 2005/0263191 A1 Dec. 1, 2005

(51) Int. Cl.
*F16K 15/02* (2006.01)

(52) U.S. Cl. .............. 137/540; 137/315.33; 137/454.2; 137/539

(58) Field of Classification Search ................ 137/269, 137/269.5, 539, 539.5, 540, 541, 454.2, 515, 137/315.33
See application file for complete search history.

(56) References Cited

U.S. PATENT DOCUMENTS

| | | | |
|---|---|---|---|
| 5,123,591 A * | 6/1992 | Reynolds | 236/34.5 |
| 6,910,494 B1 * | 6/2005 | Warsakis | 137/15.18 |
| 6,929,023 B1 * | 8/2005 | Whitaker et al. | 137/315.33 |

* cited by examiner

*Primary Examiner*—Ramesh Krishnamurthy
(74) *Attorney, Agent, or Firm*—Vierra Magen Marcus Harmon & DeNiro LLP

(57) ABSTRACT

Check valves including components having a straightforward and simple design allowing the components to be scaled down to an extremely small size without losing functionality or performance of the check valve.

13 Claims, 4 Drawing Sheets

CHECK VALVE WITH LOCKED RESTRAINT MECHANISM

BACKGROUND OF THE INVENTION

1. Field of the Invention

The present invention relates to check valves for one-way flow control and pressure relief within tubing, and in particular to check valves which may be anchored in place through the use of a barbed casing and check valves including components having a straightforward and simple design allowing the components to be scaled down to an extremely small size without losing functionality or performance of the check valve.

2. Description of the Related Art

Check valves are used in a wide variety of applications to provide accurate, reliable one-way fluid flow control and pressure relief. Applications in which check valves are typically used include medical diagnostic and treatment equipment, gas analysis equipment, filtration, beverage dispensing, semiconductor fabrication, chemical processing and many others.

While many configurations are known, a typical check valve is comprised of an annular disc, or poppet, mounted for axial translation within the cavity of a housing. A biasing mechanism such as a spring is provided to bias the poppet into a sealing position which prevents fluid flow through the valve. When mounted in a pipe, tubing or other fluid flow conduit, fluid flow acting on the poppet in the same direction as the force exerted by the biasing mechanism further increases the pressure on the seal to prevent fluid flow in that direction. On the other hand, fluid flow of sufficient pressure acting on the poppet in the opposite direction as the force exerted by the biasing mechanism overcomes the force of the spring to move the poppet out of its seat to thereby create a path for fluid to flow through the valve. The pressure at which fluid overcomes the force of the spring to unseat the poppet and allow flow through the valve is referred to as the cracking pressure.

One problem in conventional check valves relates to mounting the valve within the flow conduit. Conventional valves that are merely seated in a pipe or tubing tend to dislodge and move under fluid pressure. While it is known to machine a cavity into the conduit for seating the valve, such machining is adds time and expense to the provision of the valve.

Another problem with conventional check valves is that the moving parts are not easily scaled down for small inner diameter ("id") conduits. As the applications in which check valves are used call for smaller and smaller conduit ids, redesign of the check valve has become necessary.

SUMMARY OF THE INVENTION

It is therefore an advantage of embodiments of the present invention to provide a check valve having a design which may be easily scaled down for use in small id conduits.

It is another advantage of the present invention to provide a check valve where the poppet and spring are self-aligning within the cavity of the housing.

It is a further advantage of the present invention to provide a check valve having a range of reliable and controllable cracking pressures.

It is a still further advantage of the present invention to provide a check valve which is well suited to automated assembly.

It is another advantage of embodiments of the present invention to provide a check valve which may easily and quickly mounted in a fixed position within a conduit without machining.

These and other advantages are provided by the present invention, which in embodiments relate to a check valve including a casing having a front end a back end and an interior cavity oriented generally along a longitudinal axis of the check valve. The casing includes a pair wings formed by slots at a back end of the casing, the wings capable of resiliently spreading apart from each other. The casing further includes a pair of ramps formed in wings on an interior surface of the casing, and a pair of holes formed through the wings and being adjacent to the at least one ramp. A seat section is further formed in the interior surface of the casing near the front end.

This embodiment of the check valve further includes a stopper capable of seating within the seat section, a spring for fitting within the interior cavity and having a first end capable of engaging the stopper and biasing the stopper into the seat section, and a restraining mechanism. The restraining mechanism includes a spherical base capable of engaging the second end of the spring, a centering shaft for extending along the longitudinal axis at least partially through a center of the spring and preventing buckling of the spring as it compresses, and a pair of locking ears extending generally radially outward from the longitudinal axis of the check valve. During assembly, the restraining mechanism is forced down into the internal cavity of the casing so that the locking ears ride down the ramps and into the holes to mount the restraining mechanism within the casing. In this position, the spring is compressed to maintain the stopper within the seat section.

Each of the above described components within the casing are self aligning during assembly, thus making the current design particularly well suited for automated assembly. Moreover, the simple design allows the components to be scaled down to an extremely small size without losing functionality or performance of the check valve. A check valve according to this design may be used in conduits having an inner diameter of approximately ⅛$^{th}$ inch.

BRIEF DESCRIPTION OF THE DRAWINGS

The present invention will now be described reference the drawings, in which.

DETAILED DESCRIPTION

The present invention will now be described with reference to FIGS. 1 through 6, which embodiments relate to check valve which may be securely located within a conduit and which has a design capable of operating in narrow ID conduits. It is understood that the present invention may be embodied in many different forms and should not be construed as being limited to the embodiments set forth herein. Rather these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Figure 1:
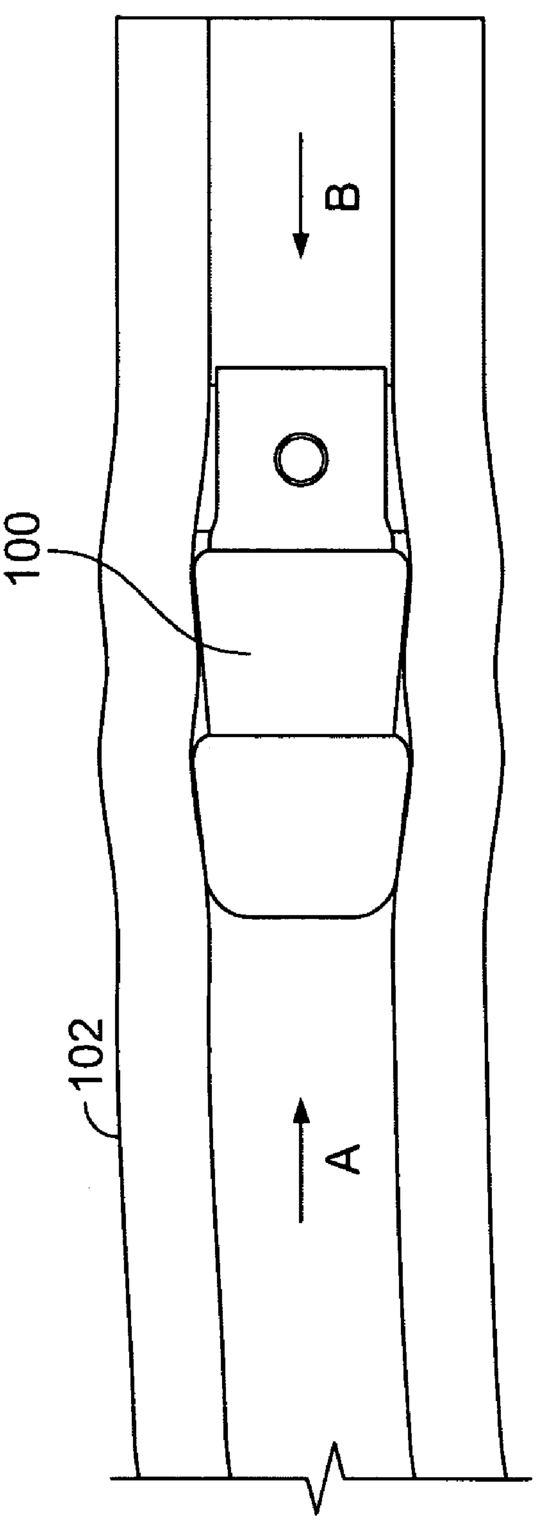
FIG. 1 is a side view of a check valve according to an embodiment of the present invention seated within a conduit such as tubing.

Referring now to FIG. 1, there is shown a check valve 100 fixedly seated within a conduit 102. Conduit 102 may for example be polymer tubing such as polytetrafluoroethylene (PTFE) tubing. However, it is understood the conduit 102 may be formed of other materials used for tubing, pipes and other conduits in which embodiments of the present invention is provided. Moreover, the check valve 100 may be mounted within a variety of other mounting designs, such as fittings and manifolds. As will be explained hereinafter, check valve 100 has a construction which anchors it into the position in which it is inserted within conduit 102, and remains there after insertion and during use.

Figure 2:
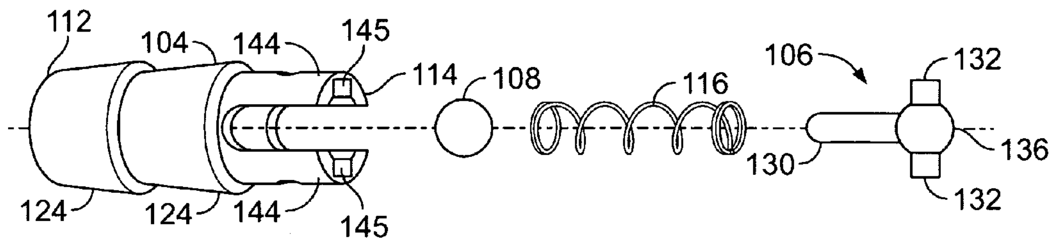
FIG. 2 is an exploded perspective view of the check valve shown in FIG. 1.

As seen for example in FIG. 2, check valve 100 may include a casing 104 including a front end 112 and a back end 114. The casing 104 receives a stopper 108 held in position by a restraining mechanism 106 and a spring 116. The casing 104 and restraining mechanism 106 may be formed of various polymers such as for example polypropylene in embodiments of the present invention. The casing 104 and/or restraining mechanism 106 may be formed of a variety of other materials in alternative embodiments including for example nylon, acrylic, Delrin®, PVDF, polycarbonate and Ultem®. Still further materials may include various rubbers and elastimers. Stopper 108 may be formed of Buna-N, but may be formed of other materials in alternative embodiments such as for example ethylene, propylene, Viton®, Alfas and Kalrez®. Spring 116 may for example be 316 stainless steel standard. Other spring materials are contemplated.

Restraining mechanism 106 includes a centering shaft 130 for fitting over at least a portion of spring 116, and a pair of locking ears 132 for fitting within a pair of holes 140 on casing 104 as explained hereinafter. The restraining mechanism 106 further includes a spherical base member 136 against which an end of spring 116 is supported upon assembly. Although called a spherical base and shown as being generally spherical in the figures, it is understood that the spherical base may have shapes other than generally spherical in alternative embodiments.

The centering shaft 130 extends from the base member 136 and may be circular in cross-section, having a diameter near to the inner diameter of spring 116. The centering shaft may have cross-sectional shapes other than circular in alternative embodiments, such as for example square. The locking ears 132 extend from opposite sides of the base member 136, generally perpendicularly to the centering shaft 130. The locking ears may be circular in cross-section, having a diameter near to the diameter of holes 140, but locking ears may have cross-sectional shapes other than circular in alternative embodiments, such as for example square. The stopper 108 may be spherical.

Figure 3:
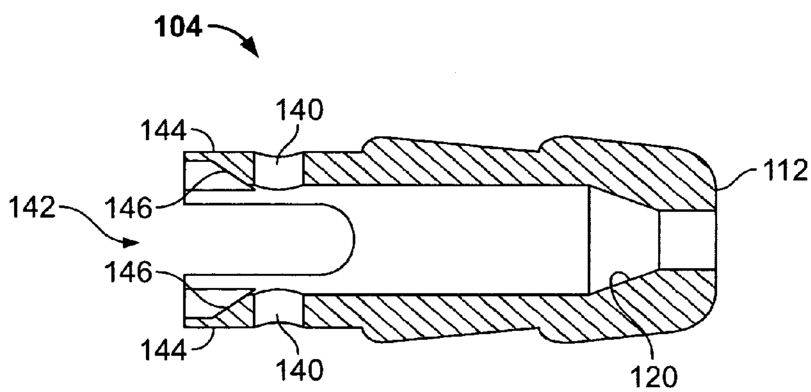
FIG. 3 is a cross-sectional front view of the casing according to the embodiment shown in FIG. 1.
Figure 4:
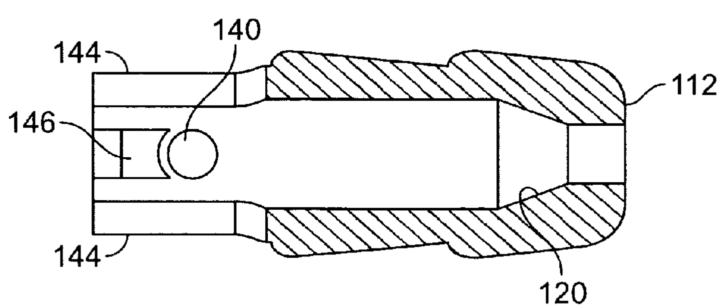
FIG. 4 is a cross-sectional side view of the casing of the check valve shown in FIG. 1.
Figure 5:
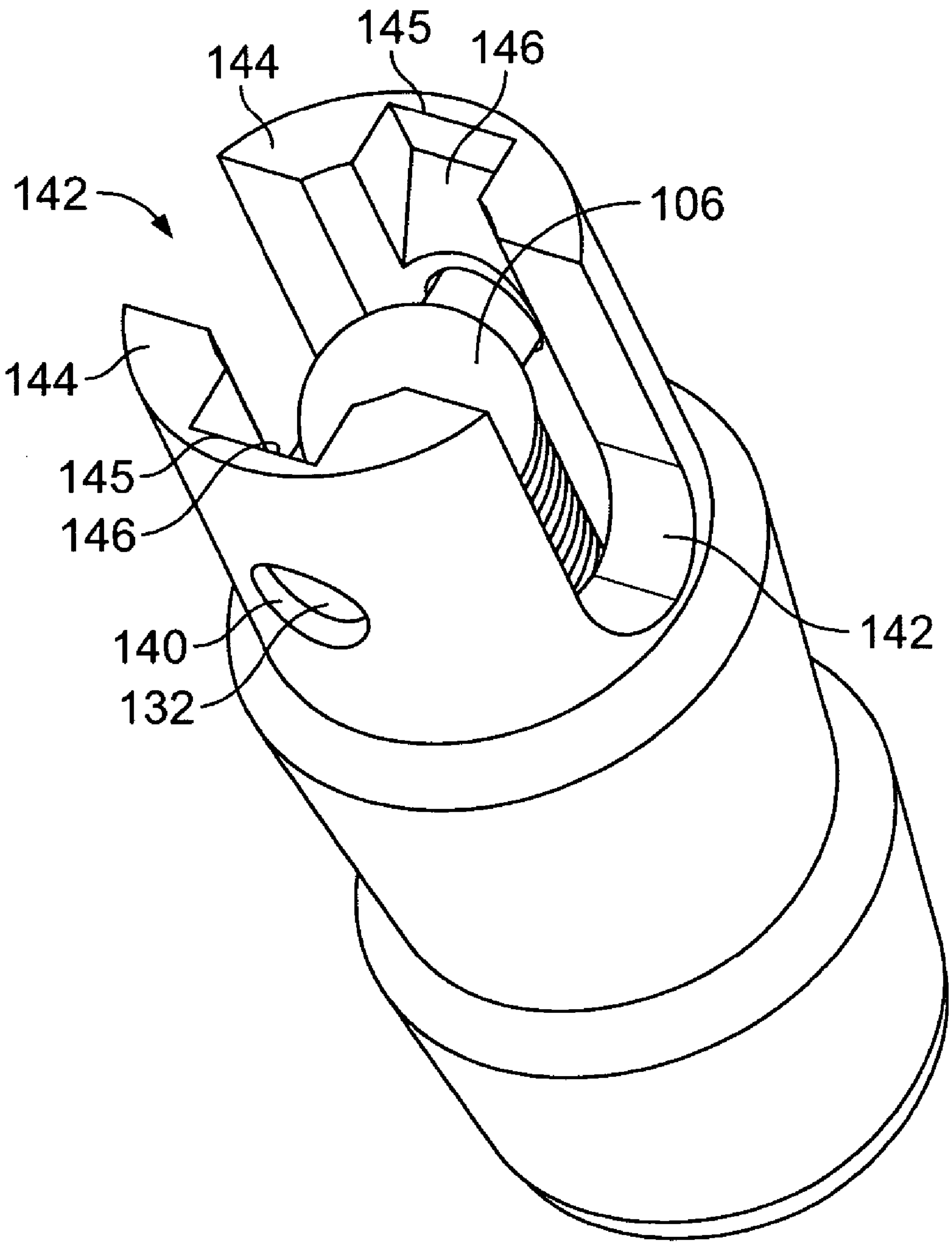
FIG. 5 is a perspective view from a first angle of the check valve shown in FIG. 1.
Figure 6:
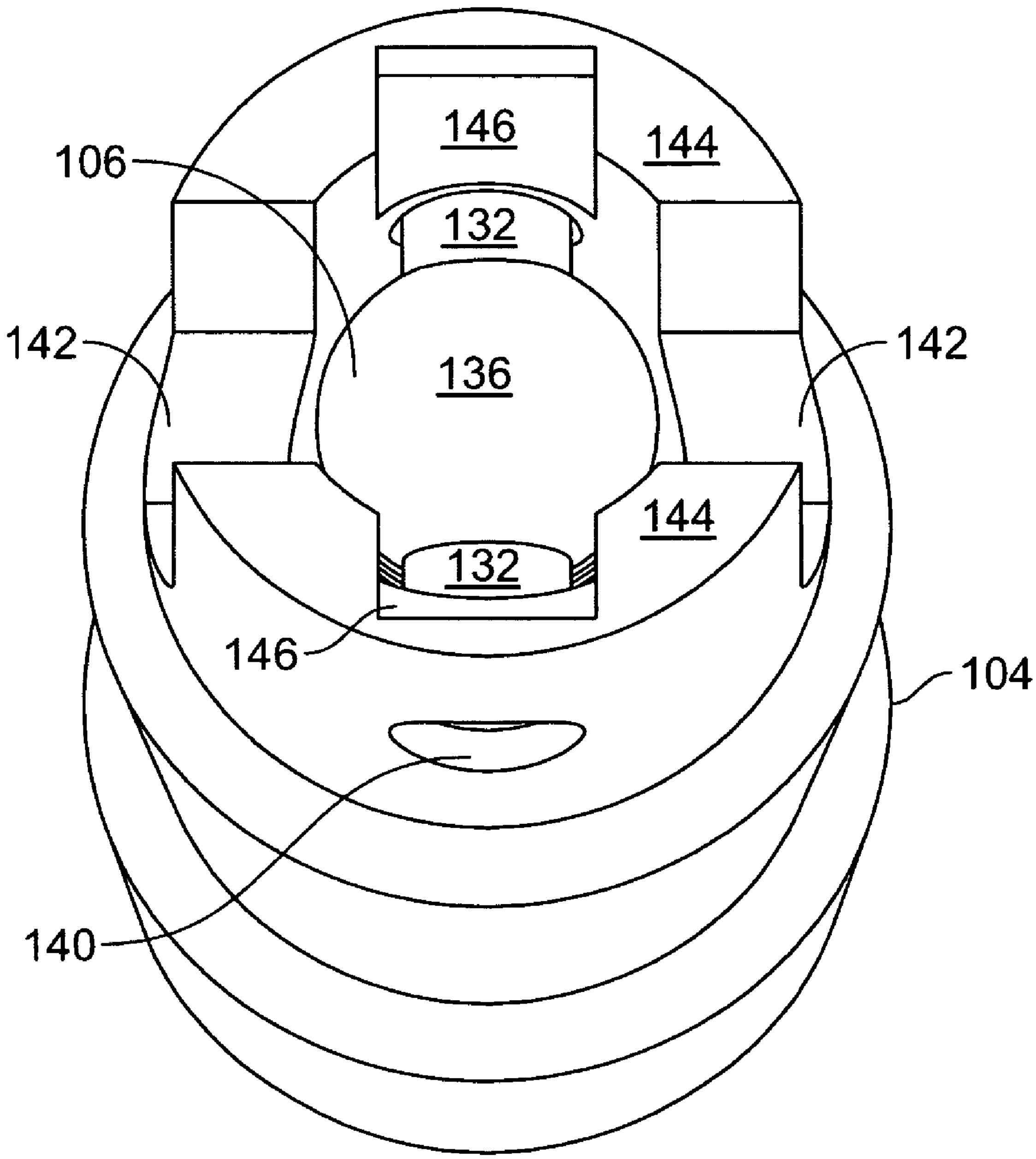
FIG. 6 is a perspective view from a second angle of a check valve according to the embodiment of FIG. 1.

Casing 104 will now be described with respect to the front view of FIG. 3, the side view of FIG. 4 and the perspective views of FIGS. 5–6. It is understood that check valve 100 may be located in conduit 102 at any angular orientation along the check valves longitudinal axis, and the use of the terms "front" and "side" with respect to FIGS. 3 and 4 denotes nothing more than at the two views from perspectives 90° apart from each other along the longitudinal axis of casing 104.

Casing 104 includes a pair of slots 142. The slots define a pair of semi-circular wings 144 near the back section 114 of casing 104. Casing 104 further includes a pair of holes 140 defined one in each of semi-circular wings 144, and a pair of ramps 146 formed on the interior surfaces of wings 144, adjacent to holes 140. As seen in FIGS. 3 and 4, the front end 112 of casing 104 includes a seat 120 formed in the interior surface of casing 104 which gets narrower toward front end 112. The ID of the seat at its narrower sections is smaller than the OD of the stopper 108. The seat may be conical or other shapes.

To assemble check valve 100, the casing 104 may be held vertically, back end 114 facing upward, and stopper 108 is inserted into the back end 114 where is falls into position within seat 120. Restraining mechanism 106 with spring 116 seated on centering shaft 130 is then inserted through back end 114 of casing 104. During insertion, when locking ears 132 contact with the back end 114 of casing 104, restraining mechanism 106 is rotated about the longitudinal axis of check valve 100 until locking ears 132 align with and are received within indents 145 (labeled on FIGS. 2 and 5). The indents are useful to allow alignment of the ears 132 with the ramps 146, which are adjacent the indents 145.

At this point the restraining mechanism 106 is further inserted into casing 104 until the locking ears clear ramps 146 and are received within holes 140. At this point, restraining mechanism 106 is locked within casing 104. Ramps 146 have surfaces which taper inward so that as restraining mechanism 106 is pushed down into casing 104 and locking ears 132 ride down ramps 146, wings 144 spread apart to accommodate the width of restraining mechanism 106 from the end of one locking ear 132 to the end of the opposite locking ear 132. Wings 144 are allowed to resiliently spread outward by virtue of slots 142. Once locking ears 132 are received within holes 140, wings 144 spring back to the unbiased position shown in the figures to lock the ears within the holes.

It is understood that one of the locking ears 132 may be omitted from the restraining mechanism and one of the ramps 146 and the adjacent hole 130 may be omitted in an alternative embodiment, so that the single locking ear rides down the single ramp and into the single hole to lock the restraining mechanism within the casing.

With ears 132 locked in holes 140 and the restraining mechanism 106 locked within casing 104, spring 116 is compressed between stopper 108 in seat 120 on one end, and spherical base 136 of restraining mechanism 106 on the other. With stopper 108 securely positioned within seat 120, fluid flow in the direction of arrow B (FIG. 1) from the back end 114 to the front end 112 is prevented. Conversely, flow in the direction of arrow A sufficient to overcome the force of spring 116 biasing stopper 108 into seat 120 will allow flow through the valve.

Although not shown, it is understood that the shape of the surfaces on the interior of casing 204 may be reversed with respect to that shown in FIGS. 1 through 6 in an alternative embodiment. In this embodiment, stopper 108 resides adjacent the back end 114 of the casing, and the wings 144 are in the front end 112 of the casing. In such an embodiment, flow is allowed in the direction opposite that allowed by the valve of FIGS. 1–6. Similarly, flow is prevented in the direction opposite that prevented by the valve of FIGS. 1–6.

The design of check valve 100 is self-aligning and particularly well suited to automated assembly. In particular, stopper 108 naturally seats within seat 120 upon insertion into casing 104 and the ends of spring 116 naturally align against stopper 108 and the spherical base 136 upon insertion. Additionally, centering shaft 130 of restraining mechanism 106 maintains spring 116 centered within the cavity on the interior of casing 104. Similarly, centering shaft 130 aligns the restraining mechanism 106, and maintains ears 132 in a generally horizontal position perpendicular to the longitudinal axis of the casing 104, as the restraining mechanism is inserted into casing 104. When locking ears 132 engage back end 114, the restraining mechanism may be rotated along the longitudinal axis until the ears align with indents 145, at which point the restraining mechanism may be further inserted into the casing. Thus, the indents naturally align the restraining mechanism to the casing. Rotation of less than 180° will be required to align ears 132 within indents 145. Once ears 132 are aligned with indents 145, the indents 145 ensure that the ears 132 will be aligned with and received within slots 146 and holes 140. The end of spring 116 also positions around the spherical surface of spherical base 136 to maintain locking mechanism 106 in a center position once locking ears 132 are positioned through the holes 140. In this manner, each of the components inserted within casing 104 are self-aligning and particularly well suited to automated assembly. The casing is also suited for automation in that the slots 142 allow the casing to be aligned during automated assembly. It is understood however that the assembly of check valve 104 as described above may be accomplished automatedly or manually. Assembly may also be accomplished with the casing 104 held in the horizontal position in alternative embodiments.

There is a further feature of check valve 104 that cracking pressures may be precisely controlled. In particular, centering shaft 130 ensures straight compression of spring 116 and prevents spring 116 from moving laterally during compression which may otherwise allow spring 116 to contact the interior walls of casing 104. Centering shaft 130 prevents portions of spring 116 from moving laterally, which lateral movement would otherwise vary the degree to which spring 116 is compressed and, accordingly, the force with which stopper 108 is held within seat 120. Additionally, if portions of spring 116 were allowed to move laterally into contact with the interior surfaces of casing 104, such frictional engagement would also unpredictably vary the forces with which spring 116 holds stopper 108 within seat 120. As centering shaft 130 prevents such lateral movement, the force with which spring 116 holds stopper 108 within seat 120 may be accurately provided, and accordingly, the cracking pressure of check valve 104 may be precisely controlled.

In embodiments of the present invention, the cracking pressure may for example range between 0.5 psi to 20 psi in alternative embodiments of the check valve. It is understood that the cracking pressure of check valve 100 may be less than 0.5 psi and greater than 20 psi in alternative embodiments. The cracking pressure of check valve 100 for fluid flow in the direction of arrow A may be precisely controlled by controlling the length of check valve 100 and spring 116 as well as the spring constant of spring 116.

Additionally, the simple design of each of the components of check valve 100 allows the components to be scaled down to an extremely small size without losing functionality or performance of the check valve. For example, check valve 100 may be used in a one-eighth inch inner diameter conduit 102. It is understood that check valve 100 may be used with conduits larger than or smaller than one-eighth inch in alternative embodiments.

Casing 104 may include one or more barbs 124 similar to barbs 124 for securely positioning check valve 100 in a fixed position within conduit 102. Each barb is formed of a conical section having a diameter which increases from the front to the back of the conical section as shown in the figures. The smaller diameter front sections allows the barbed housing to be inserted into a conduit 102, but the larger diameter back sections prevent the casing from moving once positioned. In embodiments of the present invention, check valve 100 may be used in conduits having an inner diameter of approximately one-eighth inch. For such embodiments, the narrower sections of each barb may be approximately one-eighth inch outer diameter, while the large sections of the barb may be slightly larger than one-eighth inch outer diameter, such as for example three-sixteenths of an inch.

It is understood that check valve 100 may be sized to fit within conduits larger or smaller than one-eighth inch in alternative embodiments. Moreover, it is understood that the size difference of the narrower and wider sections of each barb 124 relative to the inner diameter of the conduit may be greater or lesser than that described above. In the embodiment shown, casing 104 includes two barbed sections 124. It is understood that there may be greater than or less than two barbed sections in alternative embodiments of the present invention. Moreover, while both barbed sections are shown as being identical to each other, it is understood that the barbed sections need not be identical to each other in alternative embodiments of the present invention. In the embodiment shown, all portions of the barbs 124 have an annular cross-section in a plane perpendicular to the longitudinal axis of the casing. It is understood that cross-section in a plane perpendicular to the longitudinal axis may have shapes other than annular in alternative embodiments to match non-circular contours of section of the conduit 102 in which the check valve is located.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

What is claimed is:

1. A check valve capable of being seated within a conduit, the check valve comprising:

- a casing having a front end a back end and an interior cavity oriented generally along a longitudinal axis of the check valve, the casing further including:
  - a pair of diametrically opposed slots formed in the casing, the slots extending along a length of the casing from the back end to divide the back end into a pair of wings,
  - a pair of ramps formed in each of the wings on an interior surface of the casing,
  - a pair of holes formed in each of the wings through the casing adjacent to the ramps, and
  - a seat section formed near the front end;
- a stopper capable of seating within the seat section;
- a spring for fitting within the interior cavity and having a first end and a second end, the first end capable of engaging the stopper and biasing the stopper into the seat section; and
- a restraining mechanism, including, a spherical base capable of engaging the second end of the spring, a centering shaft for extending along the longitudinal axis at least partially through a center of the spring, and a pair of locking ears extending generally radially outward from the longitudinal axis;

wherein the restraining mechanism may be mounted within the casing by forcing the restraining mechanism into the interior cavity with the locking ears riding down the pair of ramps and seating within the pair of holes, the pair of slots allowing the wings to spread apart to accommodate the width of the restraining mechanism from an end of one locking ear to an end of the other locking ear, the wings springing back substantially to their unbiased position when the pair of locking ears are seated within the pair of holes.

2. A check valve as recited in claim 1, the spring being compressed between the stopper and the spherical base upon mounting of the restraining mechanism within the casing.

3. A check valve as recited in claim 1, fluid flow in the direction from the back end of the casing to the front end of the casing further biasing the stopper into the seat to prevent fluid flow in that direction.

4. A check valve as recited in claim 1, fluid flow above a predetermined cracking pressure in the direction from the front end of the casing to the back end of the casing biasing the stopper out of the seat to allow fluid flow in that direction.

5. A check valve as recited in claim 1, wherein the diameter of the check valve is provided to be mounted within a conduit with an approximately $1/8^{th}$ inch inner diameter.

6. A check valve as recited in claim 1, wherein an outer diameter of the casing includes barbs for anchoring the check valve in the position at which it is inserted into the conduit.

7. A check valve capable of being seated within a conduit, the check valve comprising:

a casing having a front end a back end and an interior cavity oriented generally along a longitudinal axis of the check valve, the casing further including:

a pair wings formed at a back end of the casing, the wings capable of resiliently spreading apart from each other, at least one ramp formed in at least one of the wings on an interior surface of the casing, at least one hole formed through at least one of the wings, the at least one hole being adjacent to the at least one ramp, and a seat section formed near the front end;

a stopper capable of seating within the seat section;

a spring for fitting within the interior cavity and having a first end and a second end, the first end capable of engaging the stopper and biasing the stopper into the seat section; and a restraining mechanism, including, a spherical base capable of engaging the second end of the spring, a centering shaft for extending along the longitudinal axis at least partially through a center of the spring and preventing buckling of the spring as it compresses, and at least one locking ear extending generally radially outward from the longitudinal axis for riding down the at least one ramp into the at least one hole to mount the restraining mechanism within the casing.

8. A check valve as recited in claim 7, the spring being compressed between the stopper and the spherical base upon mounting of the restraining mechanism within the casing.

9. A check valve as recited in claim 7, fluid flow in the direction from the back end of the casing to the front end of the casing further biasing the stopper into the seat to prevent fluid flow in that direction.

10. A check valve as recited in claim 7, fluid flow above a predetermined cracking pressure in the direction from the front end of the casing to the back end of the casing biasing the stopper out of the seat to allow fluid flow in that direction.

11. A check valve as recited in claim 7, wherein the diameter of the check valve is provided to be mounted within a conduit with an approximately $1/8^{th}$ inch inner diameter.

12. A check valve as recited in claim 7, wherein an outer diameter of the casing includes barbs for anchoring the check valve in the position at which it is inserted into the conduit.

13. A check valve as recited in claim 7, the casing further comprising one or more barbs for securing the check valve within the conduit in which the check valve is capable of fitting.

* * * * *